Dec. 23, 1952  R. L. HAYMAN ET AL  2,622,827
MECHANISM FOR STEERING NOSE WHEELS OF AIRCRAFT
Filed May 6, 1949  8 Sheets-Sheet 5
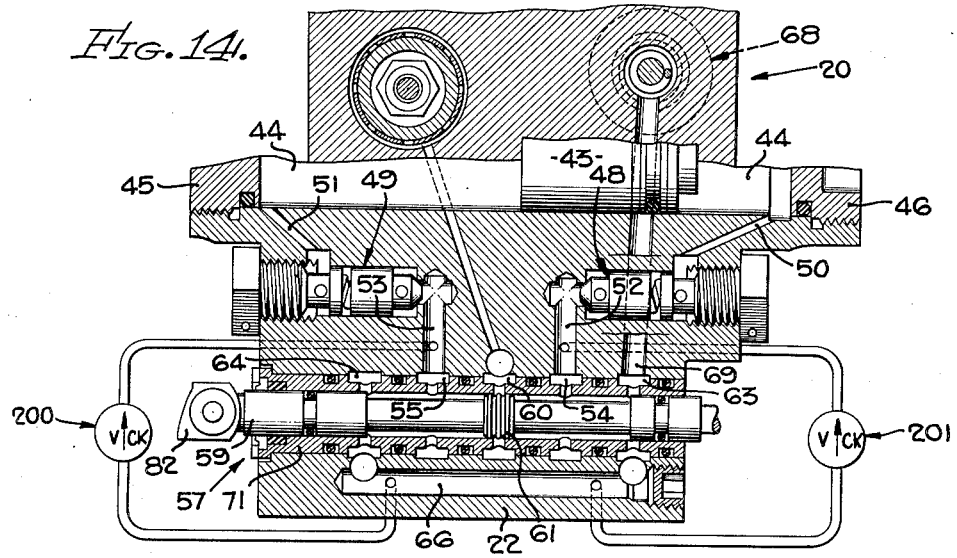
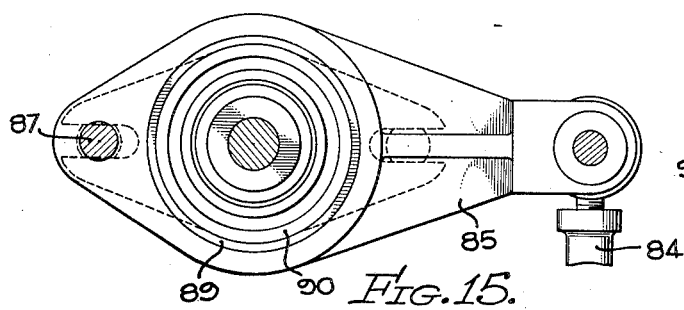
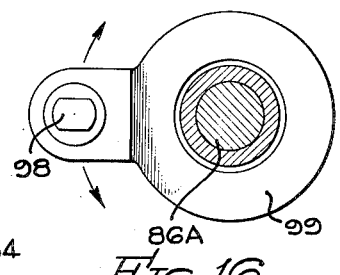
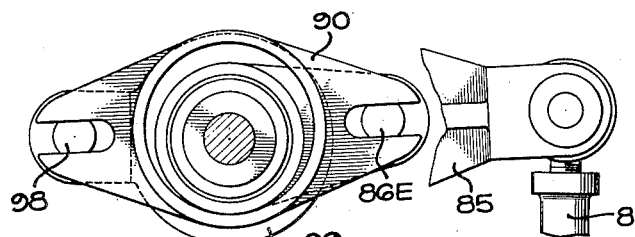
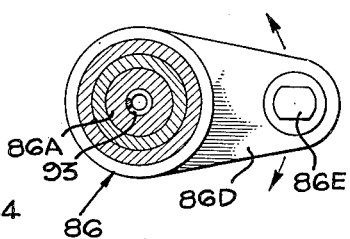
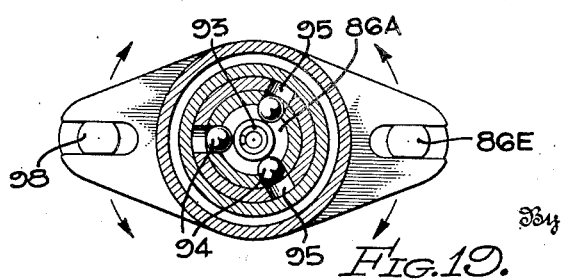
INVENTORS
RICHARD L. HAYMAN
DON W. DRISKEL
DAVID C. HILL
By Lyon & Lyon
ATTORNEYS

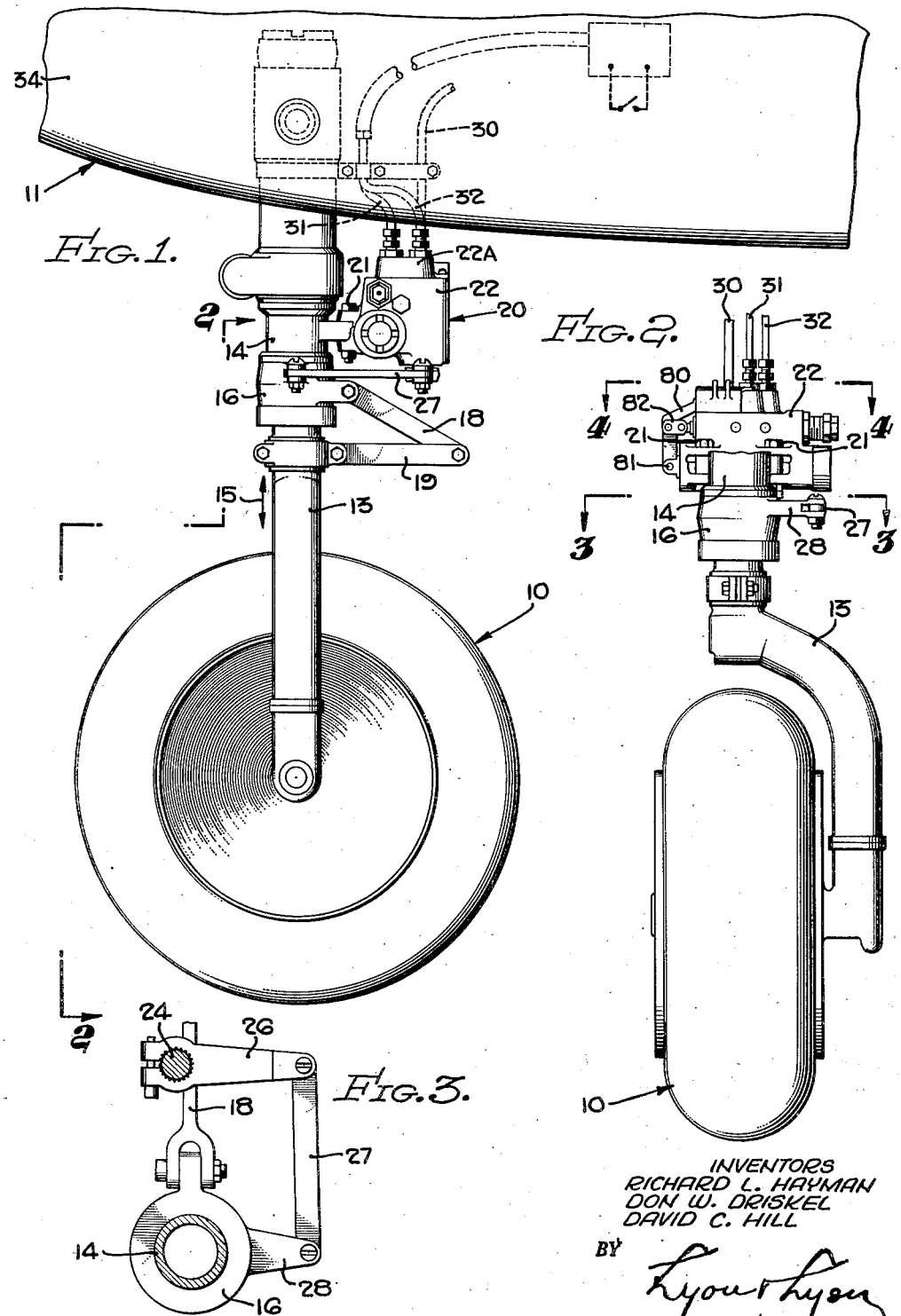

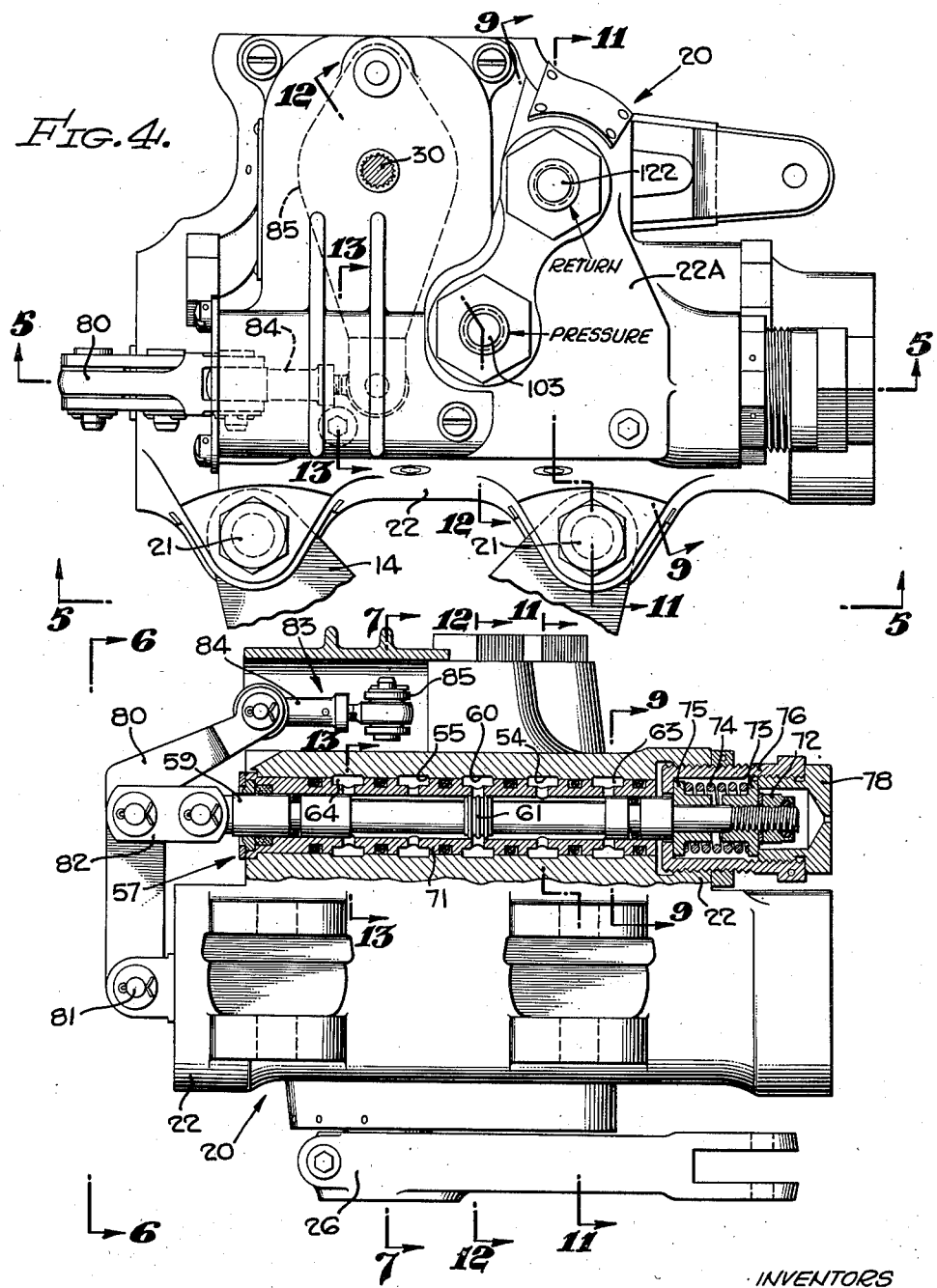

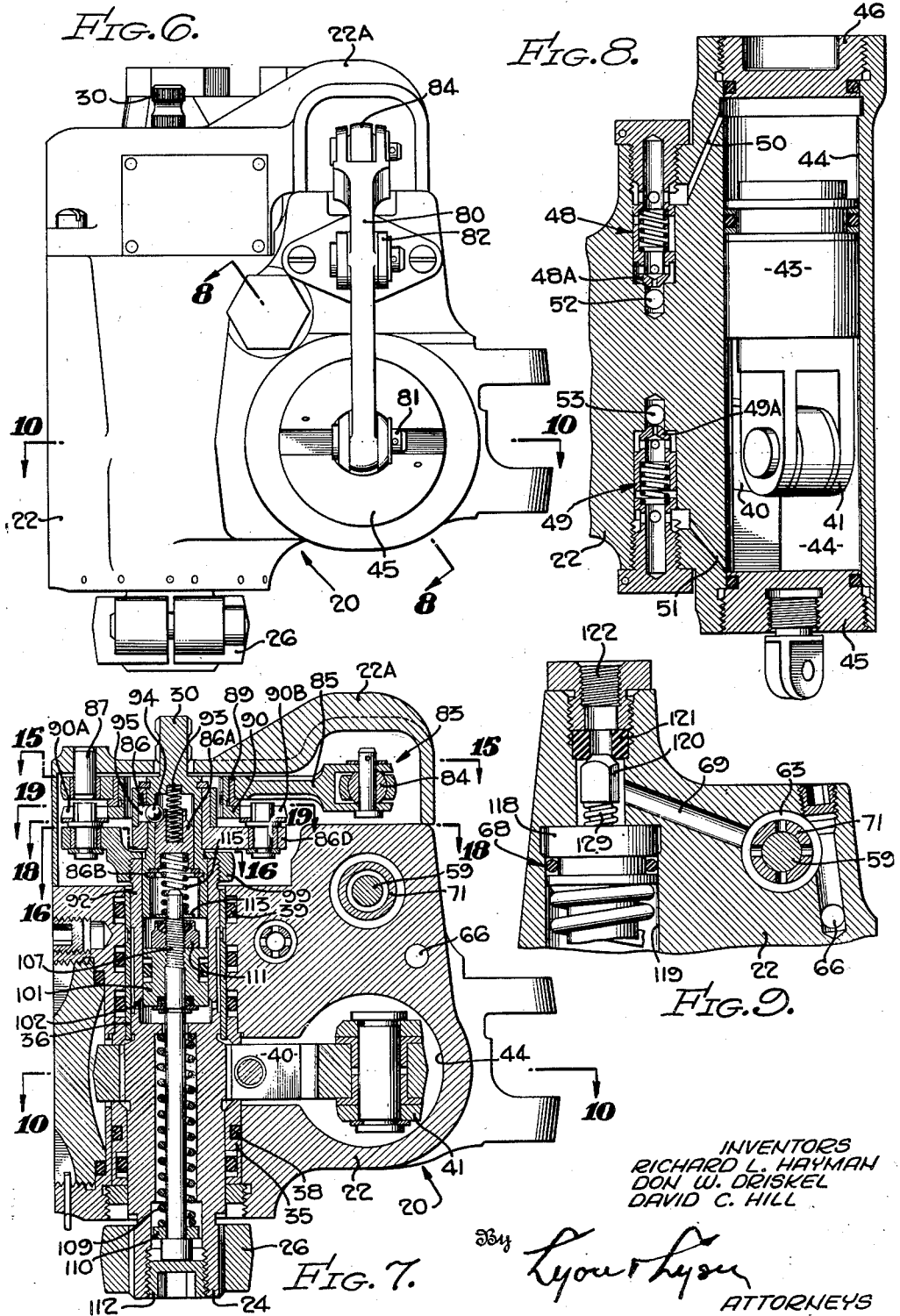

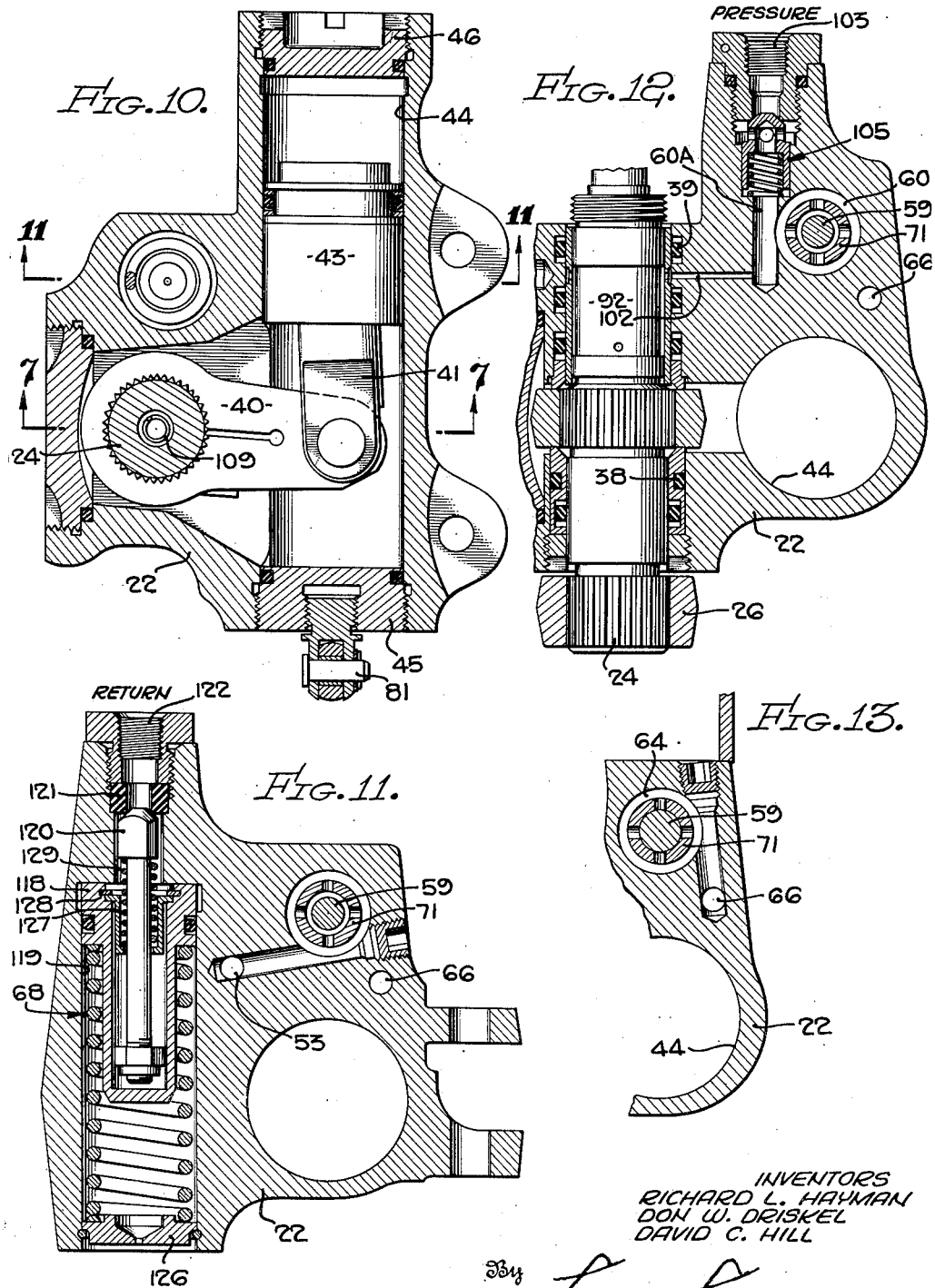

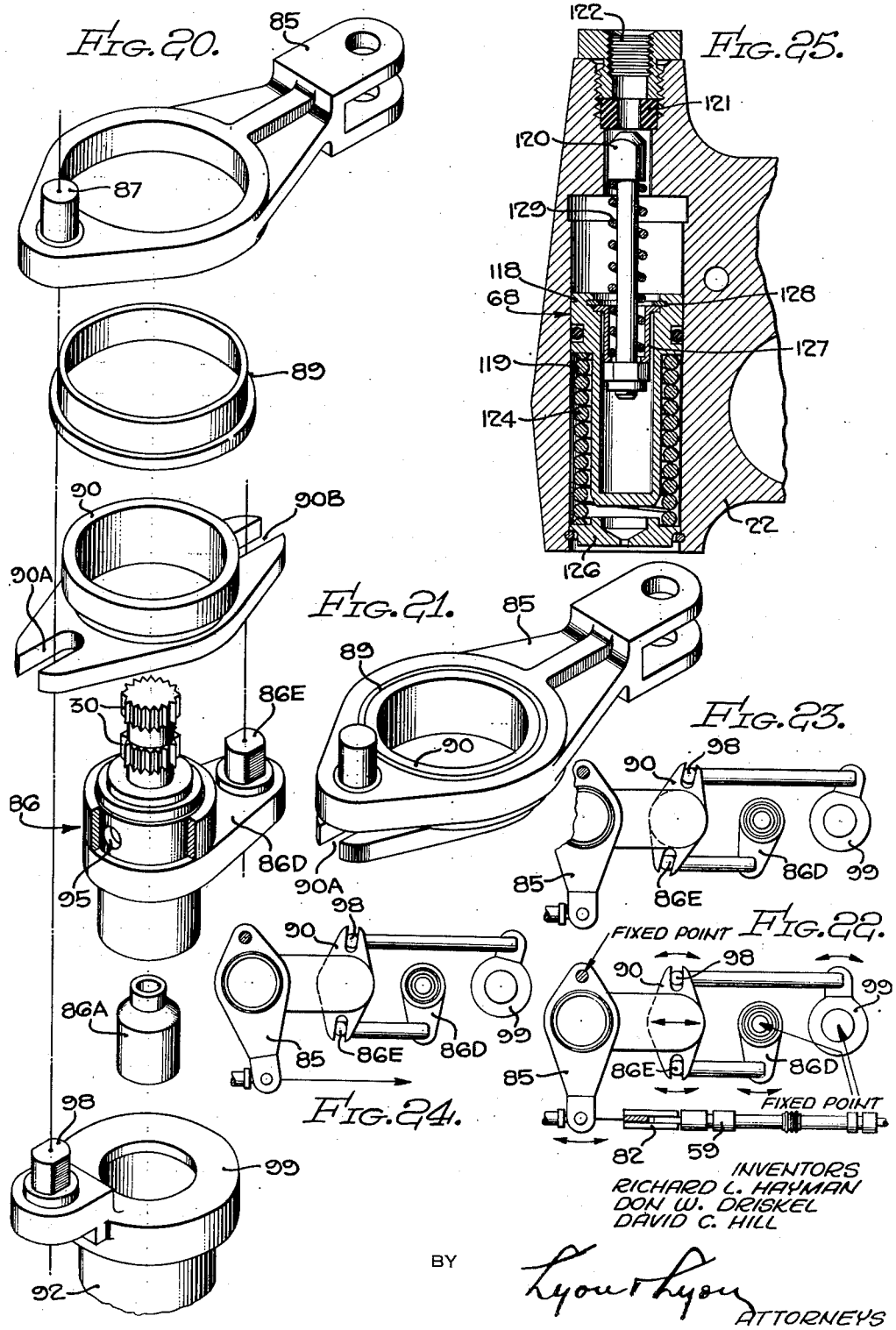

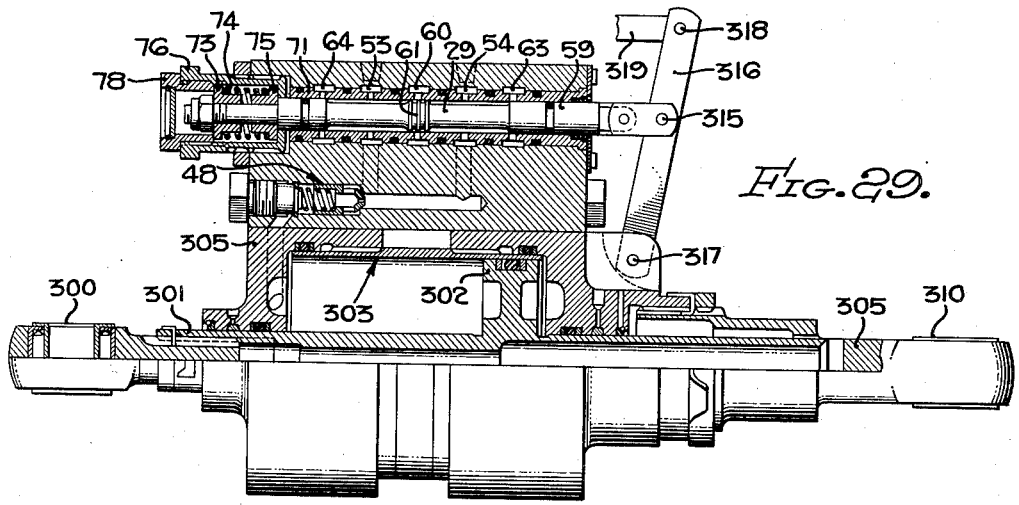
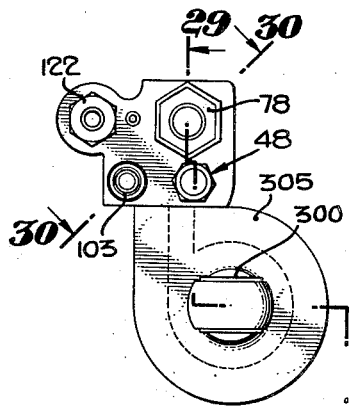
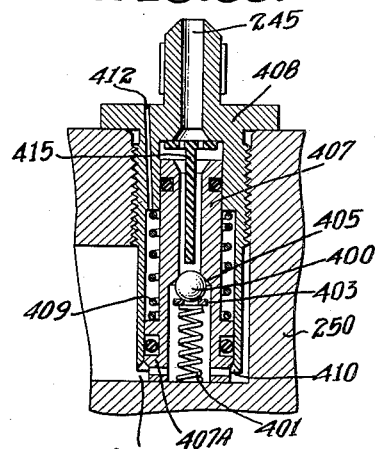
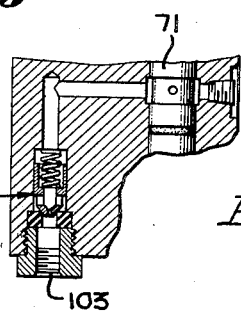
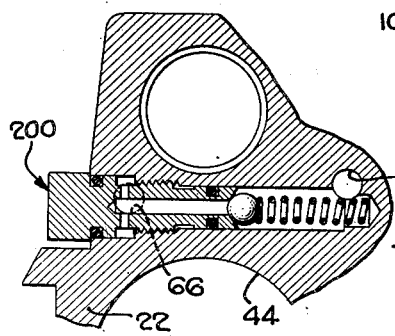

INVENTORS
RICHARD L. HAYMAN
DON W. DRISKEL
DAVID C. HILL

BY Lyon & Lyon
ATTORNEYS

Patented Dec. 23, 1952

2,622,827

UNITED STATES PATENT OFFICE 2,622,827

MECHANISM FOR STEERING NOSE WHEELS OF AIRCRAFT

Richard L. Hayman, North Hollywood, Don W. Driskel, Sherman Oaks, and David C. Hill, La Canada, Calif., assignors to Haskel Engineering & Supply Co., Glendale, Calif., a copartnership Application May 6, 1949, Serial No. 91,668

26 Claims. (Cl. 244—50)

The present invention relates to an improved mechanism for steering the nose wheel of aircraft of the type which incorporates anti-shimmy means and which may be controlled in coordination with the airplane surface controls, but which may also function to aid in moving the axis of the nose wheel to its optimum position for steering in a minimum amount of time in response to forces which tend to prevent the nose wheel from moving to its optimum position, as for example, the forces developed by tire tread reaction to ground friction forces.

An object of the present invention is to provide an improved control for the nose wheel of aircraft, the action of which may be coordinated with the action of the surface controls, the control being characterized by its lightness and compactness so that it may be mounted immediately adjacent the nose wheel to serve additional functions such as an anti-shimmy device, and also as a servo-mechanism arranged to automatically develop forces to move the nose wheel, in a minimum time, to its optimum position.

Another object of the present invention is to provide a compact assembly of element which may be manufactured and assembled inexpensively to attain the above indicated features, and which result in long life and require minimum maintenance.

Another object of the present invention is to provide an improved steering control for the nose wheel of aircraft which optionally may be used either independently of or together with the surface controls of the aircraft, whereby such control may be used alike when the aircraft is steered with the rudder control or in accordance with the conventional differential braking practice wherein one of the two undercarriage wheels of the aircraft is braked in greater degree than the other to effect turning.

Another object of the present invention is to provide an improved control of the type specified above, characterized by the fact that all of the elements for producing the above indicated purposes and advantages may be incorporated in a small compact casting or preferably forging, which may be conveniently mounted in a small space adjacent the swivel nose wheel mounting of present day aircraft.

Yet another object of the present invention is to provide an improved control for use with the nose wheel of aircraft which incorporates a so-called "load feel" mechanism adapted, for example, when the aircraft is taxiing, to provide a force in the proper direction to move said nose wheel in a minimum amount of time to its most optimum position, and yet, at the same time, to prevent overshooting or shimmying of the wheel.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a nose wheel structure in its position when the aircraft is adapted for taxiing or ground steering with the control embodying features of the present invention associated therewith.

Figure 2 is a view in elevation taken substantially in the direction indicated by the line 2—2 in Figure 1.

Figure 3 is a sectional view taken substantially on the line 3—3 of Figure 2.

Figure 4 is a view in elevation of the control embodying features of the present invention taken substantially in the direction indicated by the line 4—4 of Figure 2.

Figure 5 is a combined view in elevation and in section taken substantially on the corresponding line 5—5 in Figure 4.

Figure 6 is a view in elevation taken substantially in the direction indicated by the line 6—6 in Figure 5.

Figure 7 is a sectional view taken substantially on the lines 7—7 in both Figures 5 and 10.

Figure 8 is a sectional view taken substantially along the line 8—8 of Figure 6.

Figure 9 is a sectional view taken substantially on the lines 9—9 in both Figures 4 and 5.

Figure 10 is a sectional view taken substantially on the lines 10—10 in both Figures 6 and 7.

Figure 11 is a sectional view taken substantially on the line 11—11 in Figures 4, 5 and 10.

Figure 12 is a sectional view taken substantially on corresponding lines 12—12 in Figures 4 and 5.

Figure 13 is a sectional view taken substantially on corresponding lines 13—13 in Figures 4 and 5.

Figure 14 is a sectional view through a mechanism for more clearly portraying the functional relationship of the elements shown in the previous figures, but the structure shown in Figure 14 does not conform in all details with the structure of the corresponding elements shown in the previous figures.

Figures 15, 16, 18 and 19 are views taken substantially along corresponding lines 15—15, 16—16, 18—18 and 19—19 of Figure 7; these figures show interrelationship of elements which probably are more clearly presented in Figure 20.

Figure 17 is a view similar to the view of the elements shown in Figure 15, but certain parts thereof are broken to show additional structure when the mechanism is moved to a different position.

Figure 20 is an exploded view showing in perspective elements of the assembly shown in Figures 7 and 15-19 inclusive.

Figure 21 is a perspective view showing the top three elements shown in Figure 20 in assembled relationship.

Figures 22, 23 and 24 are diagrammatic views of structural elements intended to aid in more clearly visualizing the function and operations of the elements shown in Figure 20.

Figure 25 is a sectional view through the accumulator similar to the sectional view of the same element shown in Figure 11 but with the elements of the accumulator shown in the position they normally assume when the control is in its steering position, it being noted that the elements of the accumulator shown in Figure 11 are in the position they assume when the accumulator is discharged, it being also noted that the accumulator is charged every time it is steered.

Figure 26 is a sectional view through a modified arrangement, similar to the sectional view shown in Figure 11, and illustrates the manner in which a check valve may be interposed, on the one hand between channel 66 and channel 53, and on the other hand channel 66 and channel 52, for the purpose of preventing cavitation in the "dead-end" side of the damper piston with reduced valve opening.

Figure 27:
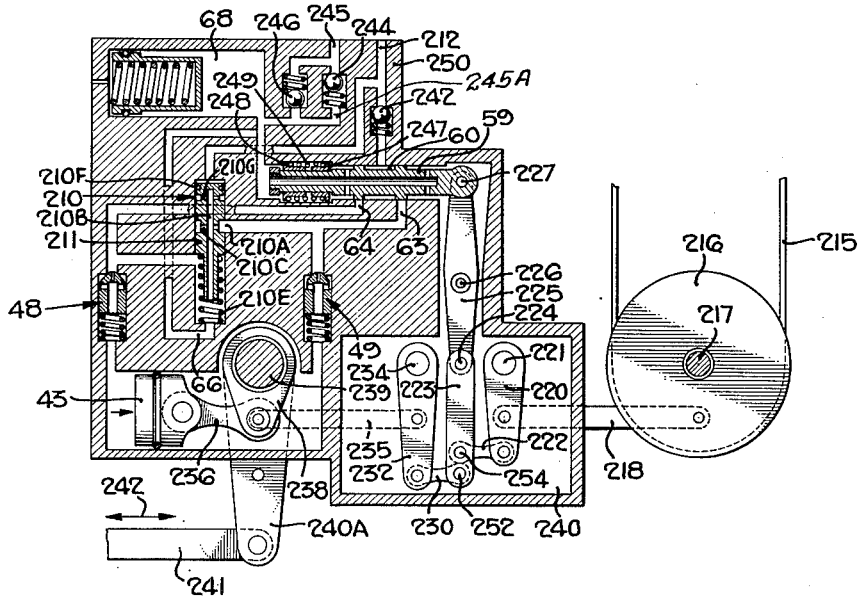

Figure 27 is a sectional view of a modified nose wheel steering structure also embodying features of the present invention.

Figure 28 is a view in end elevation of another nose wheel steering apparatus also embodying features of the present invention.

Figure 29 is a view taken substantially on the lines 29—29 of Figure 28.

Figure 30 is a view taken substantially on the line 30—30 of Figure 28.

Figure 31:
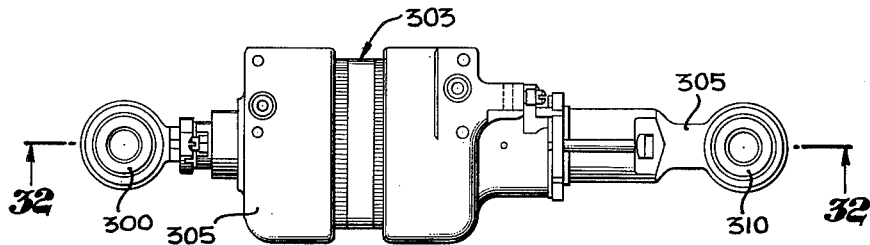

Figure 31 is a plan view in elevation of a modified structure embodying features of the present invention.

Figure 32:
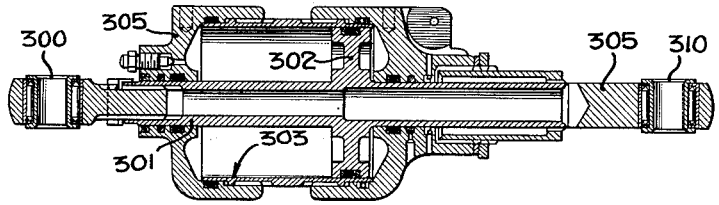

Figure 32 is a sectional view taken substantially on the line 32—32 of Figure 31.

Figure 33 is a cross-sectional view taken through a valve which may be substituted for the valves 244 and 246 in Figure 27.

The nose wheel 10 is maintained in conventional manner on the aircraft 11 so as to have desired amounts of caster to facilitate steering and to a certain extent self-steering, the wheel 10 being rotatably supported on the swivel mount 13 which extends upwardly into the relatively stationary supporting element 14, in conventional manner, so as to shock mount the wheel 10, allowing up and down movement of the wheel 10 in the direction indicated by the arrows 15 in Figure 1. A boss or bearing member 16 is rotatably mounted on the support 14 and is connected to the swivel mount 13 through a pair of pivoted link members 18, 19, also in conventional fashion, to allow turning of the boss 16 and yet allow up and down movement of the mount 13 in the direction indicated by the arrow 15.

The novel control mechanism 20, embodying features of the present invention, is mounted on the relatively stationary supporting element 14 by releasable bolt and nut connectors 21 passing through aligned apertured ears in the support 14 and housing 22 for such control mechanism 20, as indicated in Figures 1 and 4.

The control mechanism 20, thus rigidly secured on the relatively stationary support 14, as shown in Figures 1, 2 and 3, has a fluted output control shaft 24 which is link coupled to the boss or sleeve member 16 through the control lever 26, link 27 and arm 28, as shown in Figure 3, it being noted that the lever 26 is clamped to the fluted output shaft 24, and the link 27 is pin-connected at opposite ends, on the one hand to lever 26 and on the other hand to arm 28, extending from and integral with the sleeve member 16 which is rotatably supported on the relatively stationary support member 14.

The control mechanism 20 has extending therefrom and joined thereto, through suitable fittings, the three control elements comprising a flexible control cable 30, such as, for example, Bowden wire, and a pair of flexible hoses 31, 32. The hose 31 serves to introduce fluid under pressure to the control mechanism 20 and the other flexible hose 32 serves to return the fluid so delivered through hose 31.

The elements 30, 31 and 32 are purposely made flexible to allow the nose wheel to be moved to a retracted and extended position with respect to the fuselage 34 of the aircraft 11.

The control 30 is associated and operates in conjunction with the rudder mechanism of the aircraft, there being provided for this purpose conventional means, not shown herein, wherein the shaft 24 may be rotated when and as the rudder mechanism is operated. Such conventional control, not shown herein, may be rendered inoperative, in accordance with conventional practice, when and as the nose wheel is moved to its retracted position within the aircraft.

In general, rotation of the control cable 30 results in steering the nose wheel 10, provided fluid under pressure enters the control mechanism through the high pressure hose connection 31, as will be described in greater detail hereinafter. The pressure so delivered to the high pressure hose 31 may be controlled, in accordance with conventional means, and may, for example, comprise an electrical switch conveniently accessible to the pilot of the aircraft and arranged so that, so long as he maintains such switch closed, fluid under pressure is delivered to the high pressure hose 31.

Further, as is described in greater detail hereinafter, the control mechanism 20 incorporates an anti-shimmy mechanism arranged to prevent shimmy of the wheel 10; and also incorporates a servo-mechanism arranged to automatically cause the nose wheel 10 to be moved, in a minimum time, to its optimum position in free castering or taxiing operations.

The output shaft 24 of the mechanism 20, as shown in Figure 7, is journalled for rotation in the housing 22, and for that purpose there are provided the bearing inserts 35, 36, which have associated therewith fluid pressure sealing rings, such as O rings 38, 39 respectively. This output shaft 24, extending vertically substantially the full height of the housing 22, has clamped thereto at a position intermediate its ends, as shown in Figure 10, a crank member 40 having its free end connected through a knuckle joint 41 to one side of the double acting piston member 43 arranged to move in the hollow cylinder 44 formed in the housing 22. The ends of such chamber 22 are sealed by threaded plugs 45, 46. The output shaft 24 may thus be oscillated in accordance with the differential pressure existing on opposite sides of the piston 43 in chamber 44.

Opposite sides of the piston 43 are in communication, as shown in Figure 8, with check valves 48, 49 respectively, through corresponding channels 50, 51. These check valves 48, 49 control the return of flow of liquid from and to the channels 52, 53. These channels 52, 53 lead to corresponding valve ports 54, 55 (Figure 5) of the four-way valve structure 57. These fluid paths, described immediately below, extending from opposite sides of the fluid piston 43 to the valve ports 54, 55, are more clearly illustrated in the diagrammatic representation shown in Figure 14, wherein corresponding parts have identical reference numerals.

The four-way valve 57 incorporates a movable valve body 59 which has a rather limited movement to such an extent that in all positions of the valve body 59 the valve ports 54, 55 remain open. The particular means whereby such valve body 59 may be moved with respect to the stationary ports 54, 55 are described hereinafter, but briefly, the valve body in its normal position, shown in Figures 5 and 14, closes off the central high pressure port 60, using the centrally located portion 61 of increased diameter of body 59 for that purpose, while the two extreme valve ports 63, 64 are only partially closed in the normal setting of the valve body 59 shown in Figures 5 and 14. It is noted that such portion 61 of increased diameter is grooved circumferentially. It is noted further that in moving the valve body 59 from its centered position shown in Figures 5 and 14 the ports 64 or 63, as the case may be, is initially closed, before the center high pressure port 60 is opened.

Thus, referring to the diagrammatic representation in Figure 14, in the position of the valve member 59 shown therein, fluid may flow from one side of the piston 43 to the other side, but only at a controlled rate determined largely by the size of the apertures in the spring pressed movable valve members 48A and 49A (Figure 8) of the check valve members 48, 49, it being noted that the check valves 48, 49 do not, in any position thereof, block completely the flow of fluid therethrough.

Thus, with the valve element 59 in the central position shown in Figures 5 and 14, the arrangement thus far described prevents shimmying of the nose wheel 10 by damping its movement. In other words, when and if the nose wheel 10 tends to oscillate, i. e. shimmy, the motion of the nose wheel 10 is transferred to the piston 43 since it is coupled directly thereto. The motion of the piston 43, however, is damped because of the restricted central apertures in the movable elements 48A, 49A (Figure 8) of the corresponding check valves 48, 49. More explicitly, assuming that in Figure 14 the piston 43 tends to move to the right in Figure 14; in such case, fluid flows from the piston chamber 44, through the channel 50, through the restricted opening in valve 48, through the channel 52, through port 54, through the body of valve 57, to the port 63 which is interconnected by channel 66 with the other valve port 64. Fluid then flows from port 63, through channel 66, through port 64, to the adjacent valve port 55, through the restricted movable valve element of check valve 49, through the channel 51 and into chamber 44 on the opposite side of piston 43.

Such fluid on opposite sides of the piston 43 is preferably a liquid such as oil, and in order that such oil may continually be under pressure even though the valve element 59 is at its central position, wherein the high pressure inlet port 60 is blocked, pressure is supplied from the accumulator or reservoir 68 (Figures 9, 11 and 25) through the channel 69 extending, as shown in Figures 9 and 14, from such accumulator 68 to the port 63 which remains always in communication with the channel 66 and the other pressure port 64. It is noted that each time the steering mechanism is operated the accumulator is recharged.

The above describes one of the anti-shimmy features of the present control mechanism. The mechanism for moving the valve element 59 and the results produced thereby are now described hereinbelow.

The valve body 59 in Figures 5 and 14 is mounted for sliding movement in the cylindrical insert 71, which is suitably recessed at advantageous points to receive conventional sealing rings to achieve fluid-tight connections.

In Figure 5 the right hand end of the movable body 59 receives a threaded nut 72, which adjusts the position of the spring seat 73 against which one end of the coil compression spring 74 is pressed, the other end of the spring 74 engaging the spring seat 75, which abuts against the internal central flange of the bushing 76 and also against the shoulder on the valve body 59. The bushing 76 is threaded into the housing 22 and is internally threaded to receive the enclosure member 78.

It is noted that the spring seats 73, 75 are spaced and that they serve as stop members for limiting movement of the valve body 59 to the right in Figure 5. Also, such spring seats 73, 75 serve as stop members in limiting movement of the valve body 59 to the left in Figure 5. In other words, the maximum distance of travel of the valve body 59, either to the left or to the right in Figure 5, is equal to the space between the spring seats 73, 75.

The movable valve element 59 is adapted to be moved by the lever 80, which, as shown in Figure 5, is pivotally connected by means of pin 81 on the housing 22, with an intermediate point on such lever 80 connected to the valve body 59 through the link 82, the upper end of such lever 80 being connected to the valve actuating mechanism having the general reference number 83, and which is described in detail hereinbelow.

The valve actuating mechanism 83 includes a link connection 84 extending from the lever 80 to a pivoted follow-up arm 85, shown in greater detail in Figures 7 and 20.

Briefly, this follow-up arm 85 is actuated to actuate the valve body 59 either when the cable control 30 (Figures 1 and 7) is rotated when simultaneously pressure is applied to the composite control through hose 31 to effect engagement of the driving clutch 86 or, on the other hand, when the nose wheel 10 encounters some resistance in movement to an optimum position.

The follow-up arm 85 for actuating the valve body 59 carries a pin 87, which is journalled for rotation in the upper half of the housing 22A in Figure 7 so that such follow-up arm 85 is free to pivot about the axis of the pin 87. The arm 85 has press fitted into its central aperture a circular bearing or bushing 89 to accommodate, for free rotation therein, the yoke member 90 having diametrically opposed slotted portions 90A and 90B.

The yoke member 90 has a hollow round portion adapted to coaxially receive the clutch assembly 86, which includes a ball actuating member 86A. This ball actuating member 86A, as shown in Figure 7, is slidably retained by the retaining ring 86B centrally within the flexible cable connector 30, which is substantially cylindrical and normally arranged to freely rotate within the yoke 90, and within the stationary walls of the cylindrical piston chamber 92. The ball or clutch actuating member 86A is normally pressed downwardly in Figure 7 by the coil compression spring 93, to allow the clutch ball 94 to move out of the opening 95 to thereby allow free movement of the lever or crank arm 86D which has mounted thereon the stud 86E.

Thus, the inner portion of the clutch assembly 86, including the splined cable connecting shaft 30, is normally free to rotate within the piston cylinder 92 independently of the crank arm 86D rotatably supported thereon.

However, when the clutch actuating member 86A is pressed upwardly by the means described presently, the ball 94 enters the space 95 to thereby lock the interior and exterior elements of the clutch assembly 86 together, so that movement of the splined shaft 30 results in movement of the arm 86D, to in turn produce movement of the stud 86E and the yoke member 90, into which the stud 86E projects. The yoke 90, however, is prevented from rotating about its central axis since the stud 98 on the piston control crank member 99 is relatively stationary and enters the slotted portion 90A, to thereby constrain the movement of the yoke 90 to a pivotal movement about the axis of the pin 98.

Thus, since the yoke 90 pivots, the follow-up arm 85 pivots likewise to actuate the valve member 59, to thereby apply a relatively high pressure differential to the piston 43, in the manner described in greater detail hereinafter, to steer the attached nose wheel.

The piston controlled crank member 99 is internally threaded and is mounted on the upper end of the shaft 24, as shown in Figure 7, so as to move at all times synchronously with the piston 43 and shaft 24. The upper end of such shaft 24 is hollow to form the piston chamber 92, within which the fluid piston 101 may move in response to fluid pressures delivered to the piston through the port 102. This port 102, numbered both in Figures 7 and 12, is in communication with the high pressure inlet opening 103, adapted to receive the high pressure hose connection 31 shown in Figure 1. Likewise, the port 60 is in communication with channel 102 and is in communication with such inlet 103 through the check valve assembly 105, which is adapted to provide only a unidirectional flow of liquid under pressure from the pressure source in the aircraft to the channel 102 and port 60.

Fluid pressure thus delivered to channel 102, in Figure 7, acts against the bottom of the piston 101 to move it upwardly, together with the rod 107 carried thereby, to in turn move the clutch actuating member 86A upwardly into its uppermost position to produce engagement of the elements of clutch 86. In other words, as long as pressure is applied to the control through the pressure inlet opening 103, the clutch 86 is engaged to thereby establish a driving connection for the splined flexible cable input shaft 30, whereby this nose steering control, described herein, may be operated synchronously with the attached rudder operating mechanism. In other words, so long as there is no pressure applied to the inlet opening 103, operation of the rudder control mechanism (not shown) has no direct effect on the control 20.

It is noted that the piston member 101 is normally maintained in its downward position (shown in Figure 7) by the coil compression spring 109, having its uppermost end abutting an internal shoulder on the shaft 24 and the other one of its ends abutting a washer 110 pressed against the head of the pin 107. An externally threaded closure member 112 seals the opening to such pin 107.

The pin 107 carries an elastic type of stop nut 111 on its upper end as well as a washer 113 serving as a spring seat for the spring 115. The upper end of the spring 115 is adapted to press against the clutch actuating member 86A to, in effect, provide a resilient type of connection between the piston 101 and such clutch actuating member 86A.

It is evident that other means may be employed to move the clutch member 86A in response to movement of the piston member 101, and the particular means shown and described herein are representative of such other means.

Recapitulating, assuming that the pilot closes his control switch shown in Figure 1 in dotted lines, pressure is delivered to the control 20 to cause the clutch 86 to be engaged, thereby conditioning the control for operation in coordination with the rudder control, it being remembered that the splined cable shaft 30 is mechanically interconnected with such rudder control. Assuming, further, under these conditions, that the splined cable shaft 30 is turned, the crank 86D (Figure 20) is turned to thereby rotate the yoke member 90 about the axis of the stud 98 which is relatively stationary. Thus, the resulting pivotal movement of the yoke 90 about the relatively stationary stud 98 causes the follow-up arm 85 to pivot about its pivot pin 87 to produce actuation of the four-way valve element 59 (Figures 5 and 14), to thereby place the high pressure port 60 in communication either with the port 54 or with the port 55, depending upon the direction of rotation of the control shaft 30. Assuming that the motion of the valve member 59 is such as to place the high presusre port 60 in communication with the port 55, it is noted that in such case, the valve port 64 is completely closed and the other extreme valve port 63 is completely opened.

Under these conditions, oil under pressure is delivered from the high pressure port 60 to the piston 43 to cause it and the attached nose wheel to move to a different steering position. More specifically, the oil flow for accomplishing this result is in the following path: from the high pressure port 60, through the port 55, through the channel 53, (Figures 14 and 8) to the check valve 49 which opens, under the influence of the elevated pressure in the channel 53, to thereby offer a decreased resistance of oil flow through the check valve 49, the outlet of which is in communication with the channel 51, which is in turn in communication with one side of the piston 43.

When the piston 43 thus moves, oil is expelled from the chamber on the opposite side of the piston, and such oil flows in the following path: from the chamber 44, through the channel 50, through the restricted orifice of the check valve member 48A, through the channel 52, through the valve port 54 (Figures 5 and 14), through the open port 63 (Figure 9), through the channel 69, into the actuator 68 which has an expansible chamber defined in part by the movable spring pressed piston member 118 adapted to slide in the bore 119 in the control casing.

Oil thus delivered to the actuator 68 causes the spring pressed piston member 118 therein to move downwardly to its extreme position (shown in Figure 25) to carry along with it the valve member 120 in a position wherein it moves away from its cooperating seat 121 to allow the excess oil to flow upwardly out of the return flexible hose connector 122, and through the attached return hose 32 (Figure 1) leading to a reservoir in the fuselage of the aircraft.

Structurally, the accumulator 68 includes the coil compression spring 124, having one of its ends engaging the piston member 118 and the other one of its ends engaging the closure member 126, releasably maintained in the control casing 22. The valve member 120 is slidably mounted in the insert 127, which is releasably secured in the piston member 118 by a recessed locking ring 128, and is biased upwardly in Figure 25 by the coil compression spring 129, having one of its ends bearing against the metal insert 127 and the other one of its ends bearing against a shoulder on the valve plunger 120 so as to tend to maintain such valve plunger in contact with its seat 121. The seat 121 is releasably maintained in position by the screw threaded hose connector or fitting 122.

The arrangement is such that the check valve thus provided by the members 120, 121 is normally closed and is opened only when the piston member 118 approaches its most downward position (shown in Figure 25). In other words, the accumulator 68 is first substantially recharged with fluid before the check valve 120, 121 is opened. Thus, each time the nose wheel is steered in coordination with the rudder controls, such accumulator 68 is charged with fluid.

The operation of the elements shown in Figure 20 may perhaps be better described in connection with the diagrammatic representations shown in Figures 22-24 inclusive, wherein corresponding elements therein have identical reference numerals. It is observed that the yoke 90 may be pivoted about one of two axes, i. e. the axis pin 86E or 87, as the case may be, to effect the intended described results. In other words, when the aircraft is steered in coordination with the rudder control, the yoke 90 pivots about the fixed pin 98, whereas the same yoke 90 is adapted to pivot about the stud 86E when the steering is accomplished, for example, by differential braking. It is observed that the yoke 90, thus movable in either one of two directions, operates the follow-up arm in opposite directions to cause the piston 43 in attached nose wheel to move to the advantageous positions described above.

If desired, check valves may be interposed in channels, on the one hand, extending from channels 66 to 53, as shown in Figure 26, and on the other hand, in similar manner between the same channel 66 and the channel 52.

Figure 26 serves to show the manner in which such check valve is interposed between channels 66 and 53, but also the manner in which a similar check valve may be interposed between channel 66 and channel 52. In both cases these check valves allow substantially free flow of fluid from channel 66 to 53, and also substantially free flow of fluid from channel 66 to 52, but these check valves are effective to prevent the reverse flow of fluid respectively from channel 53 or 52 to channel 66. These check valves, illustrated structurally in Figure 26, are illustrated diagrammatically as the check valves 200, 201 in Figure 14. The check valve 200 controls the flow of fluid from channel 66 directly to channel 53; and, the check valve 201 controls the flow of fluid from the channel 66 to the channel 52.

The purpose of these two check valves 200, 201 is to prevent cavitation in the "dead-end" or low pressure side of the damper piston 43 when the valve member 59 is in a position corresponding to reduced valve opening. These check valves 200, 201 thus serve essentially as bypass valves. Such bypass check valves 200, 201 are considered desirable in installations wherein it is desired to minimize the required movement of valve member 59 to produce a control action, i. e. to reduce "lost motion" in the control.

In this respect, it is noted that the ports 64, 63, as the case may be, are first closed before fluid may flow from the high pressure port 60. At the same time, it is noted that in the absence of the bypass check valves 200, 201, these ports 63, 64 normally should be opened a relatively large amount for the prevention of cavitation on the "dead-end" or low pressure side of the piston 43 when the apparatus functions to prevent shimmy. Such large amount of opening of the port 63, 64 in the normal position of the valve member 59 thus results in the requirement for an increased movement of the valve member 59 to effect first closing of the valve 63 or 64, as the case may be, which results in some lost motion. By the provision of these bypass valves 200, 201, the normal opening of the ports 63, 64 may be reduced considerably to effect the reduction of "lost motion" in the control.

In the modified structure shown in Figure 27, parts corresponding to similar like parts in the previous figures have identical reference numerals.

A feature of the structure shown in Figure 27 is the provision of the pressure operated bypass valve 210 which serves normally, in the absence of hydraulic pressure applied to the inlet opening 212, to place the accumulator chamber 68 in communication with both sides of the fluid piston 43, to permit reduced travel of the steering control valve 59 to effect the desired control operations. The structure shown in Figure 27 serves one of the purposes achieved by the valves 200, 201 shown in Figure 14 in that a bypass is provided around the partially opened ports 63, 64.

In Figure 27 the valve structure 59 is somewhat different than the valve structure shown in the previous figures, but is movable longitudinally to place the high pressure port 60 in communication with either port 63 or port 64, depending upon the direction in which the valve element 59 is moved. It is noted that normally these ports 63, 64 are partially opened but not in communication with the high pressure port 60.

The valve 59 is moved upon movement of the control cable 215 which passes over the drum 216 rotatable about its axle 217. This drum is pin-connected to one end of the link 218, the other end of link 218 being pin-connected to an intermediate point on the lever 220 which pivots about its supporting shaft 221. The free end of lever 220 is in turn pin-connected to one end of the link 222, the other end of the link 222 being pin-connected to an intermediate point on the arm 223. The upper end of the arm 223 is pin-connected at 224 to one end of the rocker arm 225 which pivots about its support 226 and is pin-connected at its upper end at 227 to the valve member 59. The lower end of the arm 223 is pin-connected to one end of the link 230, the other end of the link 230 being connected to the lower end of the lever 232 which is pivotally mounted about the stationary pivot 234, and which has pin-connected thereto at a point intermediate its ends one end of the link 235, which has its other end pin-connected to the swivelled member 236 which connects to the fluid piston 43. This swivelled member 236 is likewise connected to the crank arm 238 on the shaft 239 on which the power output arm 240A is mounted to produce movement of the pin-connected link 241 in the general direction indicated by the arrows 242. This member 241 is connected to the nose wheel to effect its steering.

It is noted that the follow-up mechanism disposed in the fluid-tight chamber 240 in Figure 27 is not unlike the similar follow-up arrangement shown in Figure 22.

It is noted that the check valve 242 in the inlet channel 212 is adapted to open when the pressure therein is in the range of approximately 4 to 8 pounds per square inch. Likewise, the check valve member 244 in the outlet opening 245 is adapted to open when the pressure in such channel 245 is in such ranges of 4 to 8 pounds per square inch. On the other hand, the outlet check valve 246, also in the oil outlet channel 245, is adapted to open when the pressure therein is in the range of 175 to 275 pounds per square inch.

It is noted that, in the normal position of the valve 210 shown in Figure 27 the channel 63 is in communication with channel 66 through the port 210A and hollow channel 210B in the movable spring pressed valve member 211, it being noted that the central channel 210B is in communication with the port 210A through the radial channel 210C in the valve member 211. When pressure is applied to channel 212 the valve member 211 moves downwardly to a position wherein the valve member 211 bottoms against the shoulder 210E, in which case, the port 210A is closed off, but any leakage of oil past the seal 210F flows to the channel 66 through the radial channel 210G and central channel 210B.

A feature of the structure shown in Figure 27 is that all of the moving parts are encased in the hydraulic fluid under accumulator pressure. The accumulator 68 is spring loaded and serves to maintain a pressure of approximately 75 to 150 pounds per square inch in the unit when the external lines leading to the unit are depressurized. It is noted further that the accumulator 68 is charged with fluid each time the steering control is operated.

Since the movable parts of the unit are immersed in oil at accumulator pressure, the seals previously required on the control valve shaft 59 may be eliminated to thereby reduce the frictional drag and to improve the precision of operation.

It is noted that the valve element 59 in Figure 27 is normally maintained in centered position by the coil compression spring 249 pressing against the spring seats 247, 248. These spring seats 247, 248 abut against adjacent corresponding shoulders on the valve element 59 and the casing or forging 250. When the valve element 59 is thus moved longitudinally in either one of its two directions the spring 249 is additionally compressed.

In operation of the arrangement shown in Figure 27, assuming that the cable 215 is moved to cause the link 218 to move to the right, in such case the lever 220 pivots in the counterclockwise direction to likewise move the link 222 to the right. Thereupon, at this stage, the lever 223 pivots about the relatively fixed pivot 252 (which corresponds to the axis of the pin connecting lever 223 to link 230) to thereby cause the lever 223 to pivot in the clockwise direction and in turn to pivot the lever 225 about its axis 226 in the counterclockwise direction, to thereby move the valve element 59 to the left in Figure 27, thereby placing the high pressure port 60 in communication with the port 64. When this occurs the check valve 48 moves from its position shown therein wherein it is effective to allow only a restricted flow of fluid to its "free flowing" position to allow maximum pressure to be exerted against the lefthand side of the piston 43; whereupon such piston 43 moves to the right to cause the link 235 to move to the right and to pivot the arm 232 counterclockwise, to in turn pivot the arm 223 about the axis of the pivot pin 254, to in turn cause the valve 59 to restore it to its normal position. In other words, initially the arm 223 pivots about the axis of pin 252 and then subsequently, when and as the piston 43 is moved, such arm 223 is pivoted about the axis of pin 254 to restore the valve member 59 to its normal position in Figure 27.

In the modified arrangement shown in Figures 28–32 inclusive, the structure shown therein is similar to that shown in the Figures 1–26 inclusive, but an important difference resides in the fact that the fluid piston instead of moving is attached to a relatively stationary portion of the aircraft, while the cooperating fluid cylinder defined by the casing moves to restore the actuating valve 29 to its original position, thereby simplifying the followup mechanism.

Referring to Figure 29, the bearing 300 is attached to a relatively stationary element of the aircraft and is also affixed to the relatively stationary shaft 301 having formed thereon a circular piston member 302 (which remains relatively stationary) within the relatively movable hydraulic cylinder 303. This fluid cylinder 303 is formed in the relatively movable casing 305.

The casing or housing is prolonged and has affixed thereto the bearing 310 which is relatively movable, and which is attached through suitable cranks or levers to the nose wheel to effect steering of the same.

Corresponding elements in the modification shown in Figures 29–32 inclusive and in Figures 1–26 inclusive have identical reference numerals.

The valve member 59 in Figure 29 is pin connected at 315 to an intermediate point on a valve actuating lever 316 having one of its ends pin-connected at 317 to the casing or housing 305, and the other one of its ends connected at 318 to a control push rod 319 or the like. In operation of the device shown in Figure 29, assuming that it is desired to move the valve member 29 from its normal position to effect steering, the control rod 319 attached at 318 to the lever 316 is moved in the desired direction, in which case such lever 316 pivots about the axis of the pin 317 (which at this time is relatively stationary) to effect longitudinal movement of the valve element 59 to thereby place the high pressure port 60 in communication either with port 63 or 64, as the case may be.

The operation of the hydraulic system is essentially as described above in connection with the arrangement shown in Figures 1-26 inclusive. However, instead of the piston element 302 moving, the cylinder or housing 305 moves to thereby move the pin 317 and lever 316, which at this time pivots about its other end to which the actuating rod 319 is attached at 318, to thereby cause the valve 59 to return to its normal position shown in Figure 29. Thus a relatively simple followup mechanism is provided by allowing the housing itself to move with respect to the valve member 59.

The valve shown in Figure 33 may be substituted for the valves 244 and 246 in Figure 27. A feature of the valve shown in Figure 33 is that a relatively low pressure drop occurs through the valve once fluid passes therethrough. Corresponding parts in Figures 27 and 33 have identical reference numerals.

In Figure 33 the valve structure shown therein serves to control the flow of fluid from the inlet 245 to the outlet channel 245A, or vice versa, as the case may be. Normally, the ball 400 serves to block the flow of fluid between such channels, it being noted that the ball 400 serves as a check valve and is normally biased upwardly against its seat 405 in valve closing position between coil compression spring 401, having its lower end pressed against the casing or housing 250 and its other end in engagement with the spring seat 403 which engages the ball 400.

This valve seat 405, in turn, is a part of the hollow cylindrical member 407, which is slidably mounted in the threaded insert 408. This member 407 is normally pressed downwardly in Figure 33 by the coil compression spring 409, having its upper end pressed against a shoulder on the insert 408 and its lower end engaging an annular flange on the movable body 407, to thereby normally press the lower end 407A against the retaining ring 410 mounted on the insert 408.

In operation of the valve shown in Figure 33, when fluid under pressure enters the port 245, the ball 405 is moved against the action of its spring 401, to thereby allow such fluid to flow from the channel 245 to the channel 245A. Subsequently, when the pressure builds up in channel 245A to a pressure above atmospheric, the valve body 407 moves upwardly since the annular space occupied by the spring 409 is vented to the atmosphere through the vent channel 412.

When and as the valve body 407 thus moves upwardly, the ball 405, during a limited range, moves upwardly also under the influence of its biasing spring 401 until the ball engages the pin 415 which may be maintained on the insert 408, or free floating between the valve body 407 and the insert 408. In either case, the ball 405 is prevented from moving upwardly with the valve body 407, in which case the valve 405 is thus maintained in spaced relationship with its associated valve seat to allow free flow of fluid therethrough.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement for controlling the orientation of a nose wheel of aircraft, a single unitary housing adapted for support on the nose wheel support, said housing including a fluid piston assembly incorporating an element movable in response to pressure delivered to said assembly for connection with said nose wheel to orient the nose wheel, an oscillatable yoke member mounted within said housing, a control valve including a movable valve element adapted to control the flow of fluid to said cylinder piston assembly, said valve element and said cylinder piston assembly element being interconnected through said oscillatable yoke member, a control member mounted on said housing, and a fluid pressure operated clutch interconnecting said yoke member with said control member.

2. In an arrangement for orienting the axis of a nose wheel of aircraft, a unitary housing adapted for mounting on the nose wheel support having extending therefrom a fluid pressure inlet opening, a fluid pressure outlet opening, a control member, a pivoted arm adapted for connection to said nose wheel to orient the same, a fluid pressure piston and cylinder assembly within said housing and in communication with said inlet and outlet openings for moving said arm in response to fluid pressure delivered to said piston cylinder assembly, a valve structure including a valve control element arranged in communication with said outlet opening and with said cylinder piston assembly to control the flow of fluid thereto, a fluid responsive clutch within said housing adapted to interconnect said valve control element with said control member, and means interconnecting said arm to said valve control element.

3. In an arrangement for orienting nose wheels in aircraft, a unitary housing adapted for mounting on the nose wheel support, said housing incorporating a fluid piston and cylinder assembly adapted to orient said nose wheel in response to pressures delivered to said assembly, a valve in said housing arranged to control the flow of fluid to said assembly, said valve incorporating a valve control element, means interconnecting said valve control element to said nose wheel for movement therewith, a control member mounted on said housing, and a fluid pressure operated clutch interconnecting said valve control element and said control member.

4. In an arrangement for steering the nose wheel of aircraft, a single unitary housing adapted for mounting on a nose wheel support and being adapted to position a crank member to move said nose wheel, said housing incorporating a fluid piston cylinder assembly with an element thereof movable in response to fluid pressures delivered to said assembly, said housing incorporating a valve assembly adapted to control the flow of fluid to said piston cylinder assembly, said valve structure incorporating a movable valve control element, said housing having mounted thereon a control member, said housing incorporating a fluid pressure operated clutch adapted to interconnect said control member with said valve control element, and means interconnecting said valve control element with said member actuated by said fluid pressure piston cylinder assembly.

5. In an arrangement for controlling the position of steerable wheels, a unitary housing adapted for mounting on the support for said wheel and adjacent thereto, said housing having mounted therein a fluid piston cylinder assembly with an actuated element adapted to position said wheel in response to fluid pressures delivered to said assembly, a valve incorporating a valve control element adapted to control the flow of fluid to said assembly, a control element mounted on said housing, a clutch mounted on said housing adapted to interconnect said control element with said valve control element, and means on said housing interconnecting said actuated element and said valve control element.

6. In an arrangement for controlling steering wheels, a fluid operated motor adapted to move said wheel to different positions, said fluid operated motor including a control element adapted to control the direction of movement of said motor, to thereby move said steering wheel in opposite directions, means including a pivoted yoke interconnecting said steering wheel and said control element, and means operative to allow said yoke member to move without moving said control element, said motor including a double acting movable piston with two opposite sides, an expansible fluid accumulator normally in communication with both of said sides of said piston, and means automatically operated to charge said expansible fluid accumulator with fluid upon operation of said control element.

7. In a device of the character described, a fluid piston cylinder assembly arranged to reciprocate an actuating element, a valve in communication with said assembly and including a valve control element, a pivoted follow-up arm having one of its ends connected to said valve control element, a yoke member normally free to move about an axis passing through an intermediate point on said follow-up arm, a lever rotatable about said axis and normally in engagement with said yoke, said lever being freely rotatable, a clutch assembly adapted to lock said lever in fixed position, and said fluid piston cylinder assembly actuating element being connected to a second lever member, said second lever member being interconnected with said yoke and being movable about said axis with movement of said actuating element.

8. In a device of the character described, the sub-combination comprising: a follow-up arm adapted to actuate a valve, said follow-up arm being pivoted at one of its ends and having a hollow circular opening through an intermediate portion thereof, a yoke member oscillatable in said follow-up arm, a first lever member interconnected with said yoke to move the same, a clutch assembly centrally mounted within said central opening adapted to lock said first lever with respect to said yoke, said follow-up arm being adapted to control the flow of fluid to a fluid cylinder piston assembly having an actuated element, said actuated element being connected to a second lever member, said second lever member being interconnected with said yoke to produce movement thereof.

9. In an apparatus of the character described, a pivoted follow-up arm adapted to control a valve control element, said follow-up arm being adapted to receive at an intermediate region thereof, an oscillatable yoke which is oscillatable about an axis passing through said follow-up arm, a clutch assembly centrally mounted with respect to said yoke member, a first lever member interconnected with said yoke and adapted to be maintained in fixed position with respect thereto upon actuation of such said clutch, said follow-up arm being adapted to control the position of a fluid pressure actuated element, said last named element being interconnected with a second lever member, said second lever member being also pivoted about said axis and interconnected with said yoke.

10. In an arrangement of the character described, means incorporating a pivoted control follow-up arm adapted to move a steering wheel to different oriented positions, and means controlled at will to connect or disconnect said arm with said steering wheel to correspondingly allow or disallow said follow-up arm to move in response to the tire tread reaction of the steering wheel with the ground.

11. In a device of the character described, means incorporating a pivoted follow-up arm adapted to move a steering wheel in opposite directions, a clutch, means including an oscillatable yoke member pivoted at a point intermediate its ends for pivoting said follow-up arm in opposite directions, one end of said oscillatable yoke being connected through said clutch to a control shaft, and the other end of said yoke being interconnected with the steering wheel for movement therewith.

12. In an arrangement for orienting the position of a steering wheel, a fluid pressure cylinder having a double acting piston therein with two opposite sides, said piston being interconnectable with said steering wheel to move said wheel in accordance with the position of said piston, a control valve incorporating a valve control element adapted to control the flow of fluid pressure to said piston, said valve being normally adapted to block the flow of high pressure fluid to said cylinder from a high pressure source, and said valve normally being adapted to place said opposite sides of said double acting piston in communication with one another, a check valve having a restricted opening in each one of the two paths leading to said opposite sides of said double acting piston, an expansible fluid accumulator normally in communication with both of said opposite sides, and means automatically operated to charge said expansible fluid accumulator with fluid upon movement of said valve from its normal position wherein it is effective to block the flow of high pressure fluid.

13. In an arrangement of the character described for orienting the position of steering wheels, a fluid pressure cylinder having a double acting piston with two opposite sides attachable to said steering wheel for movement therewith, a valve having a control element adapted to control the flow of fluid from the high pressure source to said cylinder, said valve normally blocking the flow of fluid from said high pressure source and being arranged to normally maintain said opposite sides of said double acting piston in communication, a check valve in each one of the channels to each of said opposite sides of said piston, each one of said check valves having a restricted opening therethrough to allow restricted flow of fluid from one side of said piston to the other side of said piston when said wheel tends to shimmy thereby to dampen the shimmying of said wheel which otherwise may exist, an expansible fluid accumulator, said valve in its normal position maintaining said opposite sides of said piston in communication with said expansible fluid accumulator normally under high pressure, means arranged to move the control element of said valve in opposite directions to place the high pressure source in communication with one side or the other side of said piston, as the case may be, and also in communication with said accumulator to effect charging of said accumulator with fluid under high pressure regardless of the direction in which said valve control element is moved.

14. The invention defined in claim 13, characterized by the fact that means are incorporated for disabling movement of said valve control element from its normal position unless fluid under pressure is being delivered to said valve from said high pressure source.

15. In an arrangement of the character described for orienting the position of a steering wheel, a housing incorporating a double acting fluid piston assembly adapted to move a steering wheel in opposite directions, said housing including an inlet opening and an outlet opening for delivering and returning fluid to and from said assembly, an expansible wall accumulator in communication with said fluid return opening, the expansible wall of said accumulator being normally spring urged to define a minimum volume in said accumulator, and said movable wall having mounted thereon a spring pressed check valve member adapted to seal said return opening when said movable wall defines a predetermined minimum volume, to thereby block the return flow of fluid and to allow charging of said accumulator.

16. In an arrangement for orienting nose wheels in aircraft, a unitary housing adapted for mounting on the nose wheel support, said housing incorporating a fluid piston with two opposite sides and cylinder housing adapted to move and orient said nose wheel in response to pressures delivered to said assembly, a valve in said housing arranged to control the flow of fluid to said assembly, said valve incorporating a valve control element, an expansible fluid accumulator normally in communication with both of said sides of said piston to lock the same in position, and means automatically operated upon actuation of said valve control element for charging said accumulator with fluid, follow up means interconnecting said valve control element to said nose wheel for movement therewith, means effecting movement of said valve from a normal position, and means incorporating said follow up means for returning said valve to said normal position.

17. In an arrangement for orienting nose wheels in aircraft, a unitary housing adapted for mounting on the nose wheel support, said housing incorporating a relatively stationary fluid piston and a relatively movable cylinder assembly adapted to orient said nose wheel in response to pressures delivered to said assembly, a valve in said housing arranged to control the flow of fluid to said assembly, said valve incorporating a valve control element, said housing being connected to a movable control element associated with said nose wheel, and means connecting said valve control element to said relatively movable cylinder assembly for movement therewith and with said nose wheel.

18. In an arrangement of the character described for orienting the position of steering wheels, a fluid pressure piston and cylinder assembly having one of the relatively movable elements thereof attachable to said steering wheel for movement therewith, a valve having a control element adapted to control the flow of fluid from the high pressure source to said cylinder, said valve normally blocking the flow of fluid from said high pressure source and being arranged to normally maintain opposite sides of said double acting piston in communication, a check valve in each one of the channels to each of the opposite sides of said relatively movable member, each one of said check valves having a restricted opening therethrough to allow restricted flow of fluid from one side of said piston to the other side of said piston when said wheel tends to shimmy thereby to dampen the shimmying of said wheel which otherwise may exist, said valve in its normal position having ports maintaining said opposite sides of said relatively movable member in communication with an expansible wall accumulator normally under high pressure, means arranged to move the control element of said valve in opposite directions to place the high pressure source in communication with one side or the other side of said relatively movable member, as the case may be, and also in communication with said accumulator to effect changing of said accumulator with fluid under high pressure regardless of the direction in which said valve control element is moved, and a pressure operated bypass in communication with said high pressure source and arranged to bypass the flow of fluid around said valve ports.

19. In an arrangement for controlling the orientation of a nose wheel of aircraft, a housing adapted for support on the aircraft, said housing including a fluid piston assembly incorporating an element movable in response to pressure delivered to said assembly for connection with said nose wheel to orient the nose wheel, a pivoted lever pivotable about two different pivot points mounted within said housing, a control valve including a movable valve element adapted to control the flow of fluid to said fluid piston assembly, said valve element and said piston assembly element being interconnected through said pivoted lever, a control member, means producing pivoted movement of said lever about one of said pivot points upon actuation of said control member, and means pivoting said lever about its other pivot point upon movement of said fluid piston assembly element.

20. In an arrangement for controlling the orientation of a nose wheel or aircraft, the subcombination comprising: a fluid piston assembly incorporating a movable element with two opposite sides, said movable element being intended for connection with said nose wheel to orient the nose wheel, a control valve including a movable valve element adapted to control the flow of fluid to said fluid piston assembly, a control member, a mechanism including a dually pivoted lever interconnecting said control member, valve element, and piston assembly element, an expansible fluid accumulator normally in communication with both of said opposite sides to lock said movable element in position, and means automatically operated upon actuation of said control member for charging said accumulator with fluid.

21. In an arrangement for orienting nose wheels in aircraft, the subcombination comprising: a fluid piston and cylinder assembly having a movable element and adapted to orient said nose wheel in response to pressures delivered to said assembly, said piston having two opposite sides, valve means arranged to control the flow of fluid to said assembly, said valve incorporating a valve control element, follow up means interconnecting said valve control element to said assembly element, a control member, and means incorporating said follow up means interconnecting said control member to said valve element, an expansible fluid accumulator normally in communication with both of said opposite sides to prevent movement of said movable element, and means automatically operated upon actuation of said control member for charging said accumulator with fluid.

22. In an arrangement for controlling steering wheels, a fluid operated motor adapted to move said wheel to different positions, said fluid operated motor including a control element adapted to control the direction of movement of said motor, to thereby move said steering wheel in opposite directions, means including a dually pivoted lever element interconnecting said steering wheel and said control element, and means operative to allow said lever element to move without moving said control element, said motor including a double acting movable piston with two opposite sides, an expansible fluid accumulator normally in communication with both of said opposite sides of said piston, and means automatically operated to charge said expansible fluid accumulator with fluid upon operation of said control element.

23. In a device of the character described, a fluid piston cylinder assembly arranged to reciprocate an actuating element, said piston having two opposite sides, a valve in communication with said assembly and including a valve control element, a pivoted arm having one of its ends connected to said valve control element, a dually pivoted lever element connected to said arm, a control member, means interconnecting said control member to said dually pivoted lever at a first pivot point on said lever element, and means interconnecting said actuating element to a second pivot point on said lever element, an expansible fluid accumulator normally in communication with both of said opposite sides, and means automatically operated upon actuation of said control member for recharging said accumulator.

24. In a device of the character described, a fluid piston cylinder assembly arranged to reciprocate an actuating element, said piston having two opposite sides, a valve in communication with said assembly and including a valve control element, a pivoted follow up arm having one of its ends connected to said control element, a yoke normally free to move about an axis passing through an intermediate point on said follow up arm, a lever rotatable about said axis and normally in engagement with said yoke, said lever being freely rotatable, said fluid piston cylinder assembly actuating element being connected to a second lever member, said second lever member being interconnected with said yoke and being movable about said axis with movement of said actuating element, an expansible fluid accumulator, and means automatically operated upon actuation of said valve control element for recharging said accumulator, said expansible fluid accumulator being normally in communication with both of said opposite sides of said piston.

25. In an arrangement of the character described, a piston cylinder assembly having an actuating member movable thereby, a valve having an element thereof controlling the flow of fluid to said assembly, said assembly incorporating double acting pressure surfaces whereby said actuating member may be moved in opposite directions, an accumulator normally in communication with both double acting pressure surfaces to normally maintain said actuating member in an anti-shimmy condition, a control member effective to actuate said valve element, and means effective upon operation of said control member to disestablish said communication with one of said double acting pressure surfaces and to recharge said accumulator.

26. In an arrangement of the character described for steering a wheel on aircraft, a piston cylinder assembly having an actuating member movable thereby and adapted for connection to said wheel, a valve with a control element thereof controlling the flow of fluid to said assembly, means operable to move said valve control element to produce movement of said actuating member, and means, including said valve control element moving means, interconnecting said actuating member to said valve control element to produce additional movement of said valve control element in response to the tire tread reaction of the steering wheel with the ground.

RICHARD L. HAYMAN.
DON W. DRISKEL.
DAVID C. HILL.

REFERENCES CITED

The following references are of record in the file of this patent:

UNITED STATES PATENTS

| Number | Name | Date |
| --- | --- | --- |
| 721,160 | Cunningham | Feb. 24, 1903 |
| 1,859,333 | Josephs | May 24, 1932 |
| 1,885,173 | Bertram | Nov. 1, 1932 |
| 2,069,540 | Sanford | Feb. 2, 1937 |
| 2,230,361 | Morin | Feb. 4, 1941 |
| 2,271,817 | Ernst | Feb. 3, 1942 |
| 2,368,135 | Hamill | Jan. 30, 1945 |
| 2,372,710 | Chisholm | Apr. 3, 1945 |
| 2,424,806 | Eaton | July 29, 1947 |